Sept. 4, 1934.  C. J. SEVERSON  1,972,360
MILK COOLER
Filed Aug. 7, 1933   2 Sheets-Sheet 1

Inventor
Carl J. Severson
By his Attorneys

Sept. 4, 1934.   C. J. SEVERSON   1,972,360
MILK COOLER
Filed Aug. 7, 1933   2 Sheets-Sheet 2

Inventor
Carl J. Severson
By his Attorneys

Patented Sept. 4, 1934

1,972,360

UNITED STATES PATENT OFFICE 1,972,360

MILK COOLER

Carl J. Severson, Glen Lake, Minn., assignor to Instant Cooler Company, Inc., Minneapolis, Minn., a corporation of Minnesota Application August 7, 1933, Serial No. 684,004

4 Claims. (Cl. 257—179)

My invention relates to milk and cream coolers, and more particularly, to a device for cooling milk immediately after the milking operation.

The object of the invention is the provision of a milk cooler that not only removes the animal heat from the milk, but aerates and deodorizes the same. This invention further provides a highly efficient milk cooler that is simple in construction, of comparatively small cost to manufacture, and easy to keep in a sanitary condition.

To the above end, generally stated, the invention consists of the novel devices, combinations of devices, and arrangement of parts hereinafter described and defined in the claims.

In the accompanying drawings, which illustrate the invention, like characters indicate like parts throughout the several views.

Referring to the drawings.

Figure 1:
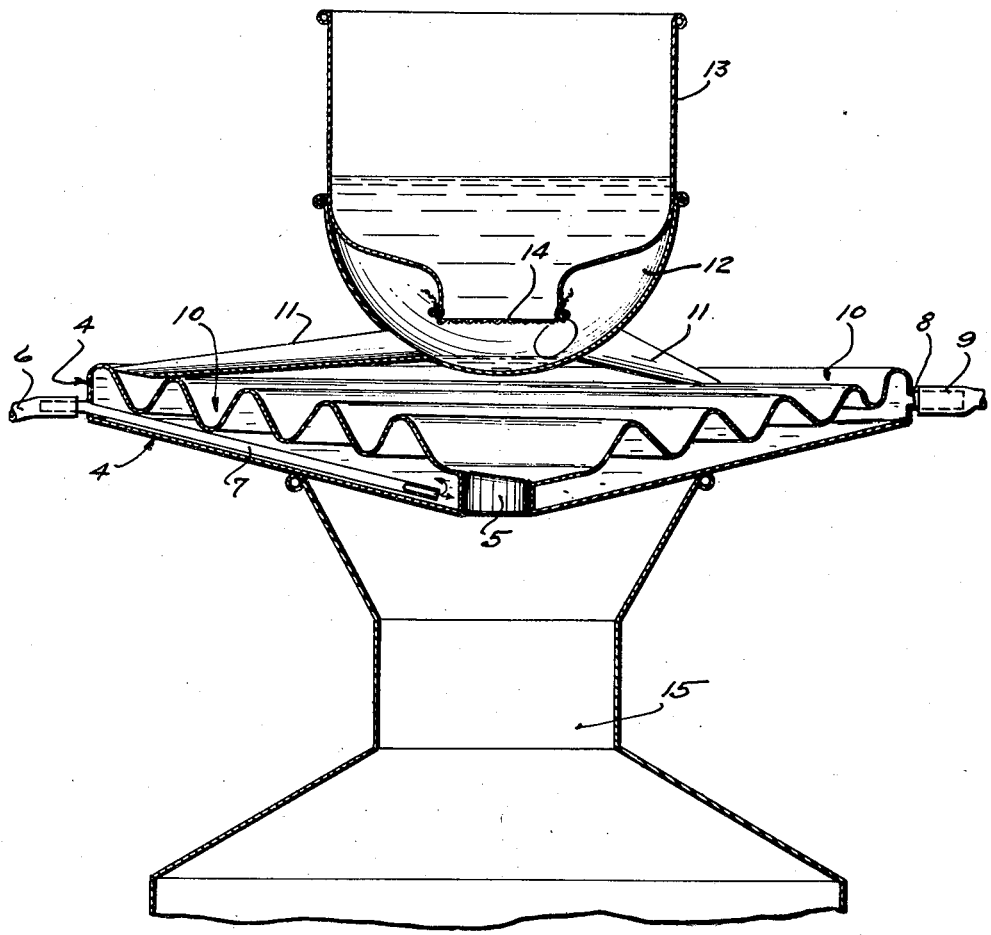
Fig. 1 is a view principally in central vertical section, with some parts broken away and also showing a strainer mounted on the improved cooler and a shipping can on which the cooler is mounted.
Figure 2:
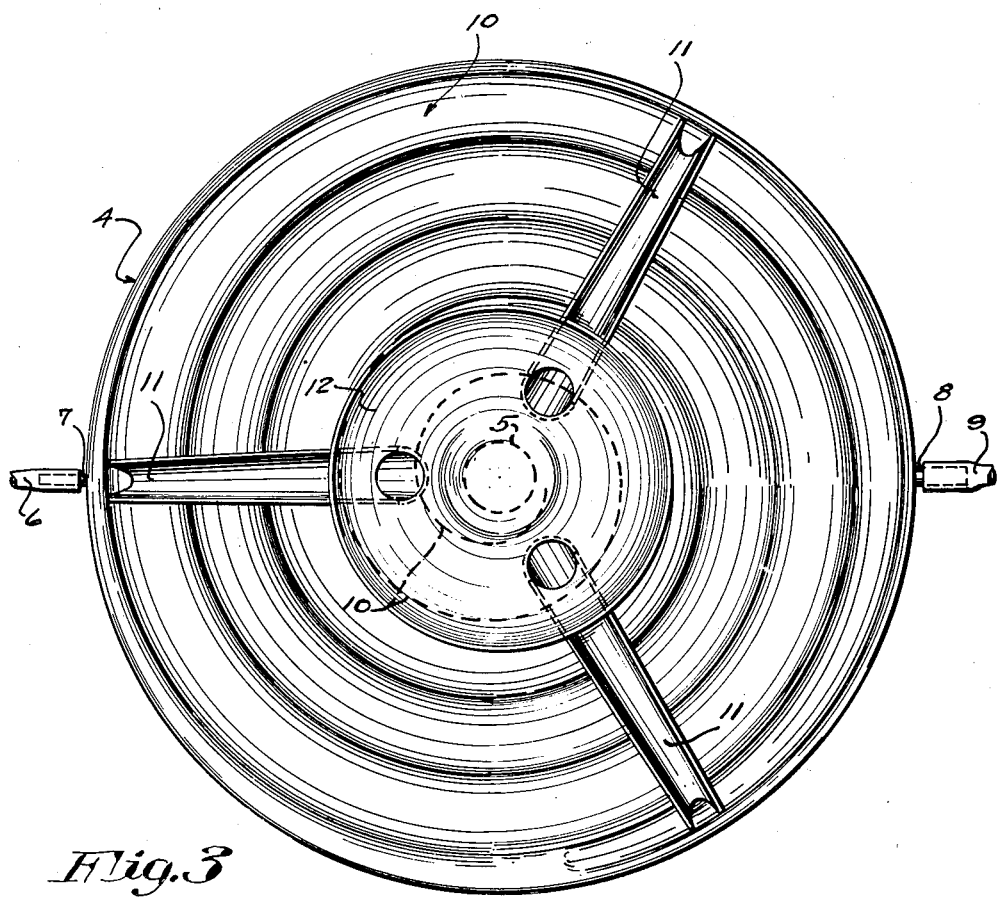
Fig. 2 is a plan view of the parts shown in Fig. 1, with the exception that the strainer is removed.

Referring first to the invention as shown in Figs. 1 and 2, the numeral 4 indicates a closed annular container that is relatively shallow for holding water or any other fluid cooling medium. At the center of the container 4 is a round hole or milk-escape passageway 5 that extends completely through said container. Both the top and bottom members of the container 4 are in the form of inverted cones. The bottom member of the container 4 is smooth and slopes gradually from the perimeter thereof to the wall surrounding the passageway 5. Cold water is supplied to the container 4 from any suitable source of supply, through a hose 6 attached to the outer or upper end of a tube 7 which extends radially into said container. This water tube 7 lies on the bottom of the container 4 and hence is downwardly inclined, and its inner or lower end terminates close to the wall surrounding the passageway 5 and delivers water into the container 4 at its lowermost point. Diametrically opposite the tube 7 is an overflow nipple 8 which projects radially outward from the side of the container 4, at substantially the highest point thereof. A hose 9 is attached to the nipple 8 and leads to any suitable point of disposal for the waste water from the container 4.

The top member of the cooler 4 is shaped, as shown, to form a spiral milk or cream channel 10 that leads from the perimeter of said member to the passageway 5. The bottom of the channel 10 gradually slopes from the uppermost convolution thereof to the passageway 5 into which it is arranged to empty. It will be noted that the sides of the channel 10 are in upwardly diverging relation, thus giving said channel a large amount of radiating surface.

Milk or cream to be cooled is discharged into the uppermost convolution of the channel 10, at three circumferentially spaced points, from troughs 11 that lead form a bowl-like receptacle 12. These troughs 11 extend radially and outwardly from the axis of the receptacle 12 and are slightly downwardly inclined for the flow of milk therein from the receptacle 12 to the channel 10. The troughs 11 rest on the top member of the container 4 and act as legs that support said receptacle on the container 4. It will be noted that the outer ends of the troughs 11 engage the outer wall of the container 4 and hold the receptacle 12 centered thereon and against shifting movement in a horizontal plane.

Removably mounted in the receptacle 12 is a strainer 13 having a hopper-like open bottom that is normally closed by a removable strainer cloth 14. The improved cooler, as shown, is removably supported on a milk or shipping can 15.

The warm milk is poured or discharged into the open strainer 13 and from thence it passes through the strainer cloth 14 into the receptacle 12, where the milk escapes to the troughs 11 and is conveyed thereby to the uppermost convolution of the channel 10. From the time milk enters the channel 10 until it is precipitated into the shipping can 15 through passageway 5, it has travelled a relatively long distance. During this flow of the milk by gravity, it is constantly coming into contact with the different heat-radiating surfaces of the top member of the cooler, and, at the same time, the flow of the cold water in the container, as the same moves in contact with the under side of the said top member, absorbs heat radiated therefrom and carries the same from the cooler. Cold water is discharged into the container 4 at the lowermost point thereof and is removed from said container at the highest point thereof.

It will thus be seen that the water, as it absorbs heat from the milk, will rise in the container 4 and thus tend to facilitate the flow of water through the container 4.

The improved cooler is constructed without sharp corners or pockets, which enables it to be easily kept in a sanitary condition.

Figure 3:
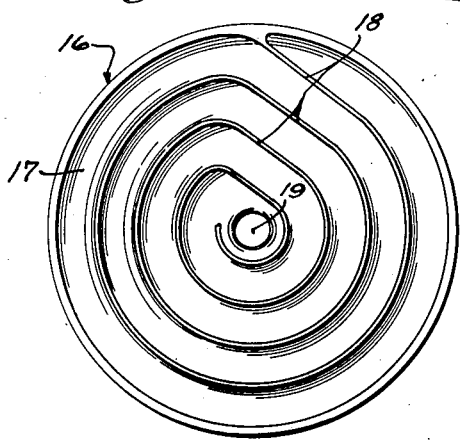
Fig. 3 is a plan view showing a slight modification of the improved milk cooler, on a reduced scale.

Referring now to the modification shown in Fig. 3, the container 16 is substantially like the container 4 with the exception that the channel 17 is substantially in the form of a spiral. The channel 17, as shown, comprises a plurality of substantially concentric sections that are cross-connected by gate-openings 18. The escape passageway in the container 16 is indicated by the numeral 19.

What I claim is:

1. In a device of the class described, a closed container for a fluid-cooling medium, a tortuous conductor on the container, and a receptacle having leg-like troughs leading therefrom and supporting said receptacle on the container and arranged to discharge into the conductor.

2. In a device of the class described, a closed container for a fluid-cooling medium, an escape passageway leading from the top of the container, a substantially spiral channel on the container that progressively approaches the escape passageway at a progressively decreasing elevation, and a receptacle having leg-like troughs leading therefrom and supporting said receptacle on the container and arranged to discharge into the uppermost convolution of the channel.

3. In a device of the class described, a closed container for a fluid-cooling medium, a tortuous conductor on the container, and a receptacle having a plurality of legs supporting said receptacle on the container, at least one of said legs being in the form of a trough leading from the receptacle and arranged to discharge into the conductor.

4. In a device of the class described, a closed container for a fluid-cooling medium, an escape passageway leading from the top of the container, a substantially spiral channel on the container that progressively approaches the escape passageway at a progressively decreasing elevation, and a receptacle having a plurality of legs supporting the receptacle on the container, at least one of said legs being in the form of a trough leading from the receptacle and arranged to discharge into the channel.

CARL J. SEVERSON.